Nov. 27, 1928.  1,693,015

J. A. BABOR ET AL

LIGHT WEIGHT MOLDED ARTICLE AND METHOD OF MAKING THE SAME

Filed Jan. 9, 1924

INVENTORS:
Joseph Albert Babor and
William Ludlow Estabrooke,
By Attorneys,
Fraser Myers & Manley

106. COMPOSITIONS,
COATING OR PLASTIC.

75

Patented Nov. 27, 1928.

1,693,015

UNITED STATES PATENT OFFICE.

JOSEPH ALBERT BABOR, OF ELMHURST, AND WILLIAM LUDLOW ESTABROOKE, OF YONKERS, NEW YORK.

LIGHTWEIGHT MOLDED ARTICLE AND METHOD OF MAKING THE SAME.

Application filed January 9, 1924. Serial No. 685,105.

This invention relates to bricks, slabs, and other molded shapes or articles, and to processes of producing the same.

The present invention provides, a brick, slab, or other molded shape or article, which is of very light weight, having good compression, tensile and breaking strength, and having good heat-insulating and fire-resisting properties. These bricks, slabs, etc. are readily penetrated by nails without breaking, and a finishing coat of a paint or of a plastic such as plaster may be very satisfactorily applied thereto. The invention further provides a very simple and inexpensive process of making the bricks, etc.

Figure 1:
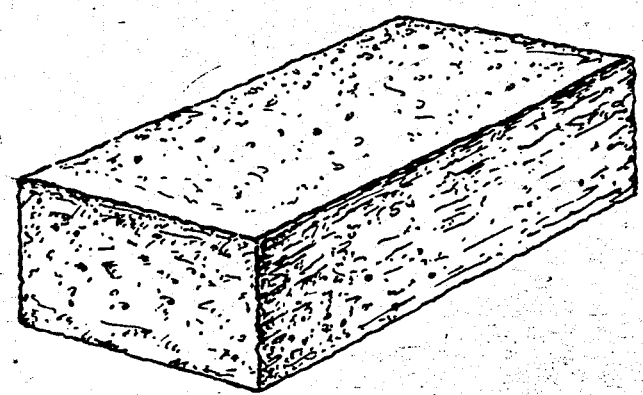
Figure 2:
Figure 3:

In the accompanying drawings,—
Figure 1 is a perspective view of a brick;
Fig. 2 is a slab, and
Fig. 3 is a molded article, as, a pipe covering, illustrating articles according to the present invention.

According to our invention the micaceous mineral zonolite (sometimes called vermiculite) is heated to a degree which causes exfoliation, an exceptional expansion and flake formation taking place. The heating may be effected by a direct flame, and a rotary kiln such as used for making Portland cement may be conveniently used.

The exfoliated or flaked mineral is then mixed with a suitable binder, molded to form and given an aftertreatment in accordance with the nature of the binder used, to form a brick, or other article.

As a binder, liquid sodium silicate (water glass) may be used. In practice commercial liquid water glass is diluted with about four parts (by volume) of water, and the mineral flakes produced by heating and the water glass solution are mixed in a vat, or mixing machine until a plastic or putty-like mass is obtained. Other materials with the zonolite may be mixed with the binder in forming the plastic mass. The flakes may be reduced to any size if desired. This mass is then put into suitable molds to shape the articles to be formed, and the molded articles allowed to dry or heated to expel the water used in mixing. This may be readily effected by heating in an oven or kiln. The particular degree of the heat is a matter of judgment, though we have found an oven temperature of 400° C. to be satisfactory, and with such a heat bricks of the size of ordinary building brick may be dried in about 2 hours.

When dried the bricks have considerable strength, as regards compression and breaking and tensile strains. The bricks are very light in weight (readily floating in water) and have good heat insulating and resisting properties. For example, the heat from an ordinary Bunsen burner applied steadily on one side of a brick will hardly be felt by the hand on the opposite side of the brick.

The bricks can be used to advantage in frame structures for fire-places, filling in spaces in partitions, etc., where the strength of the timber would not be sufficient to sustain ordinary clay brick. It is also especially useful on ship-board, and for backing fire-brick in furnaces of all kinds. In the form of slabs or bricks it is useful in ships for lining refrigerator compartments on account of their light weight, fireproof and heat insulating qualities.

In the form of slabs the invention may be used in conjunction with studding to form partitions, walls, ceilings, etc., as so-called wall board is now used. Nails for fastening the slabs may be readily driven therethrough, and a plaster or liquid coating for surfacing and finishing may be effectively applied. The material with a binder, can also be used in the same manner as plaster stucco and plaster casts, for ornamental work, and united on a suitable framework to form structures (usually temporary) for ceremonies and festivals, and stage and moving picture equipment. The lightness of molded parts or structures made according to this invention is of great advantage in the stage and moving picture industries, especially where falling structures are involved.

By reason of the lightness and heat insulating properties of articles made according to our invention, such articles may be advantageously made as a covering for steam pipes, ammonia pipes, etc. In fact wherever light bricks, slabs, or other molded articles are required our invention may be advantageously used, and such articles have also the advantage of being heat insulating, of being inexpensive, and of being easy to manufacture. Furthermore, these bricks and other articles are practically unaffected by acids and alkalies. Hydrofluoric acid is the only acid, for example, which to our present knowledge affects the minerals flakes of which our articles are formed.

The invention may receive other forms or embodiments than those herein specifically referred to and may be carried out by other modes of procedure than that specifically given herein.

What we claim is:

1. A molded article comprising exfoliated zonolite and a binder.

2. A molded article comprising exfoliated zonolite and a binder of water glass.

3. A molded article comprising exfoliated zonolite and a binder, said article being of less specific gravity than water.

4. A process of making molded articles, comprising heating zonolite to exfoliate the same, mixing it with a binder, and molding to the desired form.

5. A process of making molded articles, comprising heating zonolite to exfoliate the same, mixing it with a solution of water glass, molding to the desired shape and driving off the water from the mixture.

6. A stucco article or structure comprising exfoliated zonolite and a binder.

In witness whereof, we have hereunto signed our names.

JOSEPH ALBERT BABOR.
WILLIAM LUDLOW ESTABROOKE.